(12) United States Patent
Drumm

(10) Patent No.: US 8,468,820 B2
(45) Date of Patent: Jun. 25, 2013

(54) BRAKE ACTUATING UNIT

(75) Inventor: Stefan A Drumm, Saulheim (DE)

(73) Assignee: Continental Teves AG & Co. oHG (DE)

( * ) Notice: Subject to any disclaimer, the term of this patent is extended or adjusted under 35 U.S.C. 154(b) by 637 days.

(21) Appl. No.: 12/742,724

(22) PCT Filed: Oct. 29, 2008

(86) PCT No.: PCT/EP2008/064662
§ 371 (c)(1),
(2), (4) Date: May 13, 2010

(87) PCT Pub. No.: WO2009/065709
PCT Pub. Date: May 28, 2009

(65) Prior Publication Data
US 2010/0263367 A1    Oct. 21, 2010

(30) Foreign Application Priority Data

Nov. 21, 2007  (DE) .................. 10 2007 055 509
Aug. 22, 2008  (DE) .................. 10 2008 039 306

(51) Int. Cl.
*F15B 7/00*    (2006.01)
(52) U.S. Cl.
USPC ............................ 60/545; 60/547.1; 60/562
(58) Field of Classification Search
USPC ............. 60/545, 537, 538, 547.1; 303/155, 303/20
See application file for complete search history.

(56) References Cited

U.S. PATENT DOCUMENTS

| | | | | |
|---|---|---|---|---|
| 4,395,883 A | * | 8/1983 | Melinat | 60/545 |
| 4,398,389 A | * | 8/1983 | Horvath | 60/545 |
| 4,812,723 A | | 3/1989 | Shimizu | |
| 6,957,871 B2 | * | 10/2005 | Maki | 303/114.1 |
| 7,290,841 B2 | * | 11/2007 | Isono | 303/114.1 |
| 2001/0030463 A1 | | 10/2001 | Tanaka et al. | |
| 2003/0024245 A1 | | 2/2003 | Fulks et al. | |
| 2005/0252734 A1 | | 11/2005 | Giering | |

FOREIGN PATENT DOCUMENTS

| | | |
|---|---|---|
| DE | 195 10 522 A1 | 9/1996 |
| DE | 199 39 950 A1 | 5/2000 |
| DE | 101 14 843 A1 | 10/2001 |
| DE | 10 2004 024 403 A1 | 12/2005 |
| DE | 10 2007 016 861 A1 | 10/2008 |
| DE | 10 2007 016 863 A1 | 10/2008 |
| DE | 10 2007 018 469 A1 | 10/2008 |
| EP | 1 638 830 B1 | 9/2007 |

* cited by examiner

*Primary Examiner* — Edward Look
*Assistant Examiner* — Logan Kraft
(74) *Attorney, Agent, or Firm* — RatnerPrestia

(57) ABSTRACT

Disclosed herein is a method of determining the brake pedal actuation force exerted by a vehicle driver on an actuating pedal in an electrohydraulic brake system which includes a brake master cylinder and an electromechanically driven booster stage connected upstream of the brake master cylinder. The brake pedal actuation force sought is determined according to the formula $F_{Ped,Bet}=F_{Bet,Hz}-F_{Verst}$ by evaluating output signals of a pressure sensor which detects the pressure induced in the brake master cylinder, and of an auxiliary force determining device which detects the boost force made available by the booster stage.

18 Claims, 4 Drawing Sheets

BRAKE ACTUATING UNIT

CROSS REFERENCE TO RELATED APPLICATIONS

This application is the U.S. national phase application of PCT International Application No. PCT/EP2008/064662, filed Oct. 29, 2008, which claims priority to German Patent Application No. 10 2007 055 509.3, filed Nov. 21, 2007, and German Patent Application No. 10 2008 039 306.1, filed Aug. 22, 2008, the contents of such applications being incorporated by reference herein.

FIELD OF THE INVENTION

The present invention relates to a brake actuating unit consisting of a brake master cylinder which is actuatable by means of a brake pedal and to which wheel brakes of a motor vehicle are connected, of a booster stage which is connected upstream of the brake master cylinder and which additively superposes an auxiliary force on a brake pedal actuation force and actuates a brake master cylinder piston with the sum of both forces, of an electromechanical drive unit for generating the auxiliary force and of a device for determining a brake pedal actuation force.

BACKGROUND OF THE INVENTION

A brake actuating unit of this type is known, for example, from EP 1 638 830 B1, which is incorporated by reference. The brake master cylinder and the booster stage with its electromechanical drive form a pressure generator which generates a braking pressure corresponding to a sum of an actuation force generated by the vehicle driver on a brake pedal and a boost force generated by the booster. The particular features of the previously known brake actuating unit are, inter alia, an input force sensor for detecting a signal representing the actuation force exerted by the driver, and an electronic control unit which activates the electromechanical drive of the booster stage as a function of signals supplied by the input force sensor. In the known actuating unit, the input force sensor is integrated in a piston rod which is coupled to the brake pedal and which, in the event of, inter alia, failure of the electronic control unit, enables an actuation of the brake master cylinder by the brake pedal. The input force sensor therefore moves with the piston rod upon each actuation of the brake pedal. The high manufacturing cost associated with the use of a force sensor is to be regarded as a particular disadvantage of the known brake actuating unit. The electrical connection of the force sensor to the electronic control unit is also very complex and costly, because, as already mentioned, the force sensor is integrated in the piston rod and therefore is arranged movably in relation to the electronic control unit.

SUMMARY OF THE INVENTION

It is therefore an object of the present invention to propose a brake actuating unit of the type mentioned in the introduction in which precise determination of the pedal actuation force exerted by the vehicle driver is possible, which determination can be implemented at low cost and, in particular, requires no electrical connection of moving components.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
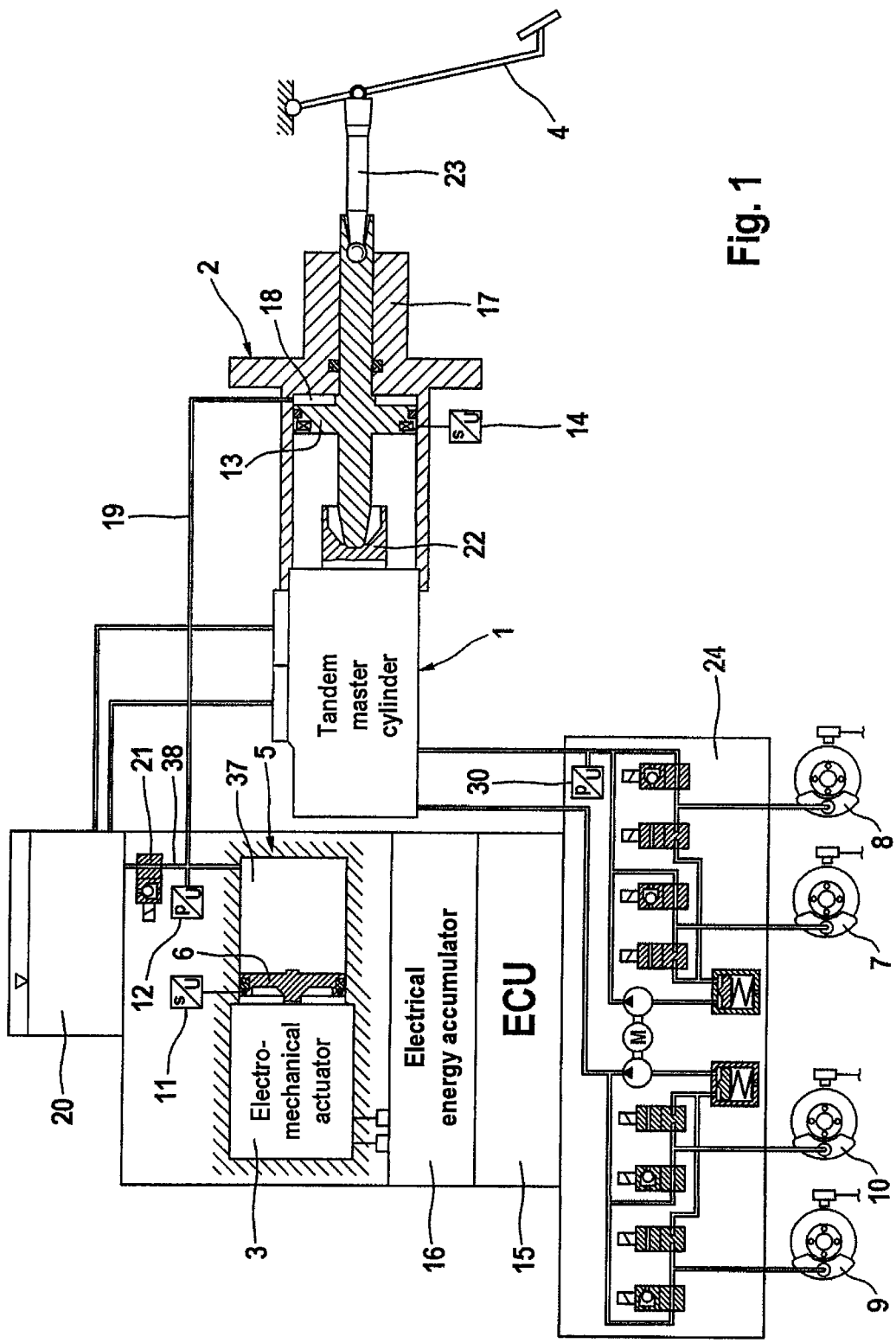
FIG. 1 is a schematic representation of a first embodiment of the subject matter of the invention.

The brake actuating unit shown in a schematic representation in FIG. 1 consists essentially of a brake master cylinder 1, preferably a tandem master cylinder, a booster stage 2 operatively connected upstream of the brake master cylinder 1, and a drive unit 3 which serves to drive the booster stage 2 and is formed by an electric motor. For activation of the brake actuating unit according to aspects of the invention there is provided a brake pedal 4, to which is coupled a piston rod 23 which is in force-transmitting communication, via an interposed booster piston 13, with a first piston or primary piston 22 of the brake master cylinder 1. Together with a second or secondary piston (not shown) of the brake master cylinder, the primary piston 22 delimits pressure chambers (not shown) to which wheel brakes 7, 8, 9, 10 of a motor vehicle are connected via an interposed wheel pressure modulating device 24. The booster piston 13 is guided in an axially displaceable manner in a booster housing 17 in which it delimits a hydraulic booster chamber denoted by reference numeral 18. Force is transmitted from the drive stage 3 to the booster stage 2 by means of an electrohydraulic cylinder/piston arrangement 5, the piston 6 of which is driven by an electromechanical actuator or electric motor. The brake actuating unit is supplied with electrical energy from an onboard electrical network (not shown) of the vehicle. In order to make the operation of the brake actuating unit independent of the availability of the vehicle onboard network, which according to breakdown statistics has a high failure rate in comparison to brake systems, there is provided an electrical energy accumulator 16 from which the electronic control unit 15 and the electric motor 3 are supplied with buffered electrical energy. A pressure chamber 37 of the cylinder/piston arrangement 5, delimited by the piston 6, is connected to the aforementioned booster chamber 18 by means of a connecting line 19 which enables the booster piston 13 to be subjected to a pressure induced in the pressure chamber 37, from which results a boost force $F_{Verst}$ acting on the booster piston 13. A pressure sensor 12 connected to the connecting line 19 is used to detect the pressure induced in the pressure chamber 37. In a rest state of the brake actuating unit, a line section 38 establishes a hydraulic connection of the hydraulic chambers 37 and 18, connected by the line 19, to an unpressurized pressure medium reservoir 20, The line section 38 can be blocked by means of a preferably electromagnetically activatable 2/2-way valve 21. A displacement sensor 11 is used to detect the distance $s_1$ traveled by the piston 6 of the cylinder/piston arrangement 5, while the distance $s_2$ traveled by the booster piston 13 is detected by a second displacement sensor 14. The integrity of the line connection 19 and the blocking function of the valve 21 can be determined in operation of the brake actuating unit by means of correlation of the two displacement signals. The pressure induced upon actuation of the brake master cylinder 1 is determined with a pressure sensor 30, which in the example illustrated is integrated in the wheel pressure modulating device 24. As is known to a person skilled in the art, the booster piston 13 performs the function of an addition element which transmits the total force $$F_{Bet,Hz} = F_{Ped,Bet} + F_{Verst}$$

to the primary piston 22 of the brake master cylinder. The two aforementioned pressure sensors 12, 30 form a brake pedal actuation force detecting device, the function of which is explained in the following text. The above-described first variant of the invention has the advantage that both the actuation force $F_{Bet,Hz}$ of the brake master cylinder 1 and the boost force $F_{Verst}$ can be detected using pressure sensors well tried in motor vehicle brake technology. It is also advantageous that the electrohydraulic cylinder/piston arrangement 5 can be arranged in a separate module. For example, it can be allocated, together with the electronic control unit 15, to the wheel pressure modulating device 24 connected downstream, which may be in the form of an ABS or ESP unit. It is therefore also possible to integrate the electronic control unit 15 in an electronic ABS/ESP control unit (not shown).

The principle for determining the pedal actuation force $F_{Ped,Bet}$ acting on the brake pedal 4 is the previously described equation according to which the pedal actuation force sought is $$F_{Ped,Bet} = F_{Bet,Hz} - F_{Verst}.$$

The subtraction indicated is carried out mathematically in the aforementioned electronic control unit 15. In this calculation, use is made of the fact that the total force $F_{Bet,Hz}$ is proportional to the hydraulic pressure $p_{Hz}$, measured by the second pressure sensor 39, and the boost force $F_{Verst}$ is proportional to the hydraulic pressure in the booster chamber 18 measured by the first hydraulic sensor 12. The parameters required for the calculation, in particular proportionality factors, are stored in the electronic control unit 15. Otherwise, the person skilled in the art is familiar with the operation of the brake system described, so that a detailed description is unnecessary.

Figure 2:
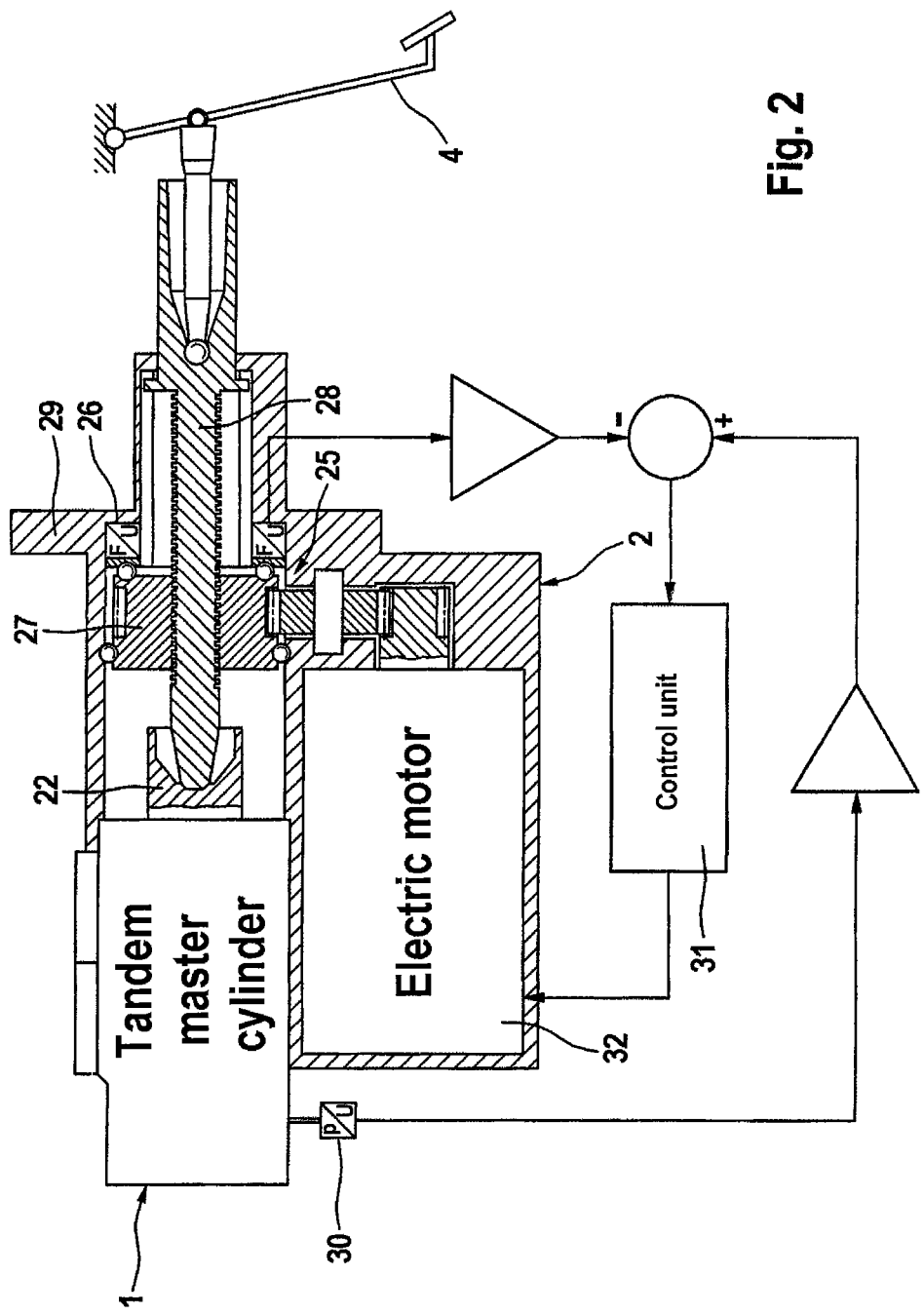
FIG. 2 is a schematic representation of a second embodiment of the subject matter of the invention.

In the second embodiment of the invention, represented in FIG. 2, the booster stage 2 is formed by a reduction gear 25 which is in the form a ball screw drive 27, 28. In this case the threaded nut 27 is driven by an electric motor 32 serving as a drive, while the threaded spindle 28 is connected in a force-transmitting manner to the brake pedal 4 on one side and to the primary piston 22 of the brake master cylinder 1 on the other.

Upon activation of the brake actuating unit shown in FIG. 2, a force sensor 26 fixed to the housing determines the force $F_{Abstütz}$ with which the axially immovable, driven threaded nut 27 is supported against a booster housing 29 accommodating the ball screw drive 25 and 27, 28 and the drive motor 32. The support force mentioned is equal to the boost force generated by the ball screw drive 27, 28. In order to determine the pedal actuation force $F_{Bet,Ped}$ sought, this force, together with the output value of the pressure sensor 30 mentioned in connection with FIG. 1, is supplied to an electronic control unit 31, which calculates the brake master cylinder actuation force $F_{Bet,Hz}$ acting on the primary piston 22 from the pressure value $P_{Hz}$ supplied by the pressure sensor 30.

In a concluding step for determining the brake pedal actuation force $F_{Bet,Ped}$ sought, the boost force is subtracted from the brake master cylinder actuation force $F_{Bet,Hz}$ in accordance with the equation established in the context of the above-described first embodiment of the invention.

Figure 3:
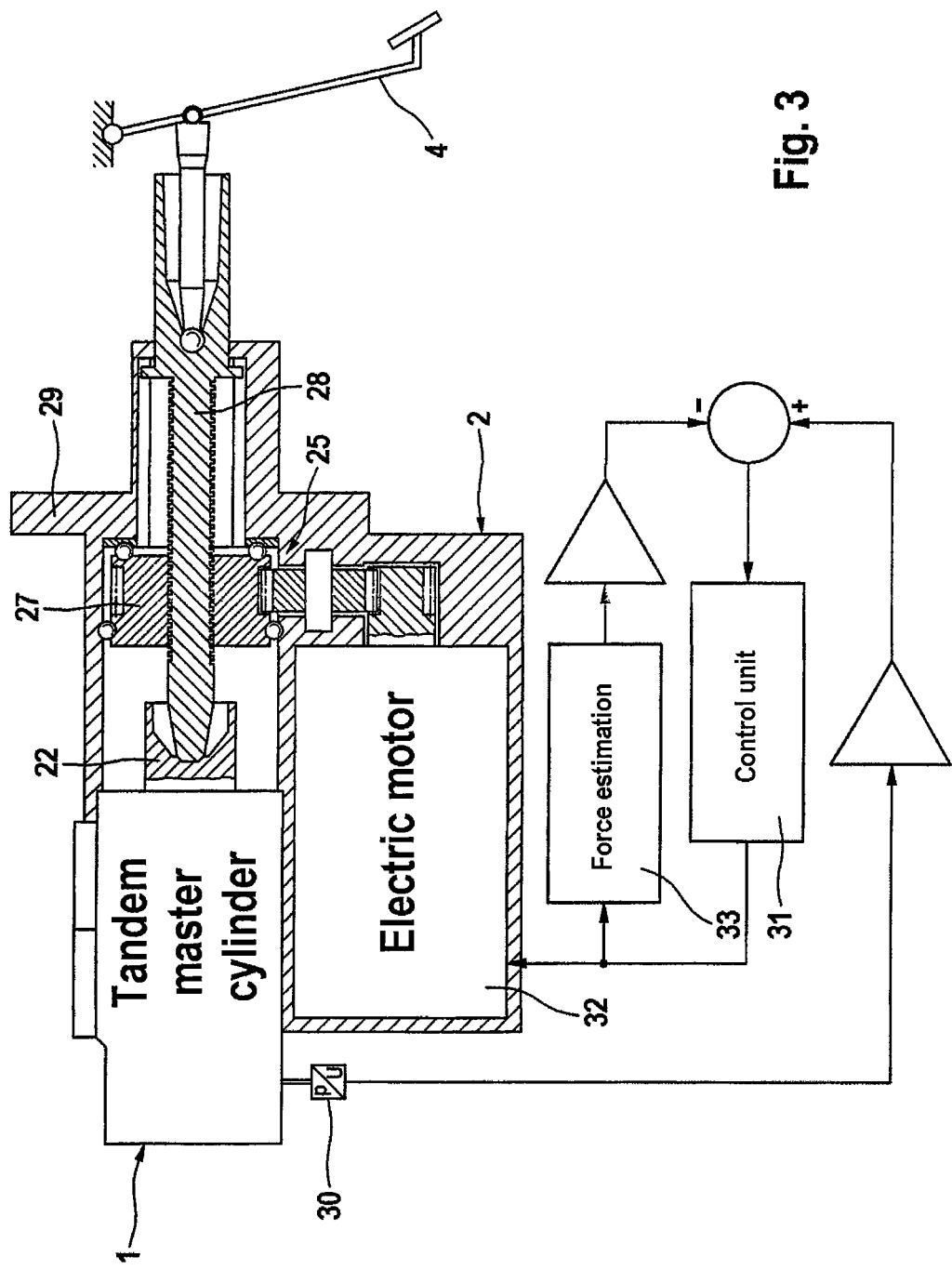
FIG. 3 is a schematic representation of a second embodiment of the subject matter of the invention.

The structure of the third embodiment of the invention, shown in FIG. 3, corresponds extensively to the structure of the second embodiment described in the previous paragraph. The only difference is that, instead of the force sensor for determining the aforementioned support force, a device 33 for estimating said force is provided, the output value of the device 33 being used instead of the signal of the force sensor 26 in calculating the pedal actuation force $F_{Bet,Ped}$. The output value of the electronic control unit 31 used for activating the drive motor 32 is supplied as an input value to the force-estimating device 33.

Figure 4:
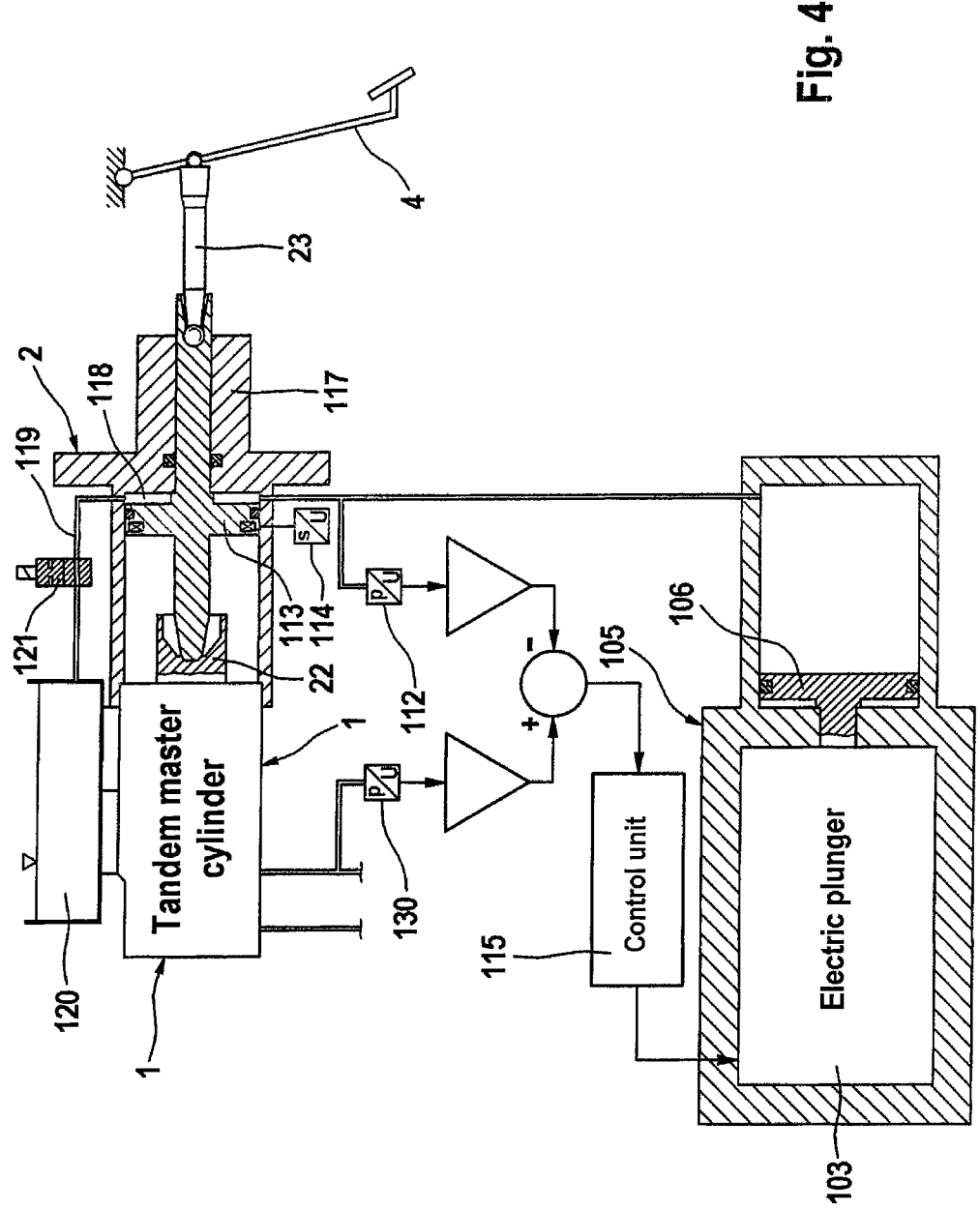
FIG. 4 is a schematic representation of a fourth embodiment of the subject matter of the invention.

The fourth embodiment of the invention shown in FIG. 4 has substantially all the technical features which have been described in connection with the first embodiment of the subject matter of the invention shown in FIG. 1, and the reference numerals of FIG. 4 have been increased by 100 in relation to those in FIG. 1. In this illustration the proposed processing of the signals representing the brake master cylinder actuation force $F_{Bet,Hz}$ and the boost force $F_{Verst}$ and the subtraction thereof in order to form a signal for the pedal actuation force $F_{Bet,Ped}$ are elaborated in particular. The components energy accumulator (16 in FIG. 1) and the displacement sensor for detecting the travel of the piston 106 (11 in FIG. 1), which are less important in this context, have been omitted.

The invention claimed is:

1. A brake actuating unit comprising:
   a brake master cylinder which is actuatable by a brake pedal and to which wheel brakes of a motor vehicle are connected,
   a booster stage which is connected upstream of the brake master cylinder and which additively superposes an auxiliary force on a brake pedal actuation force and actuates a brake master cylinder piston with a sum of both forces,
   an electromechanical drive unit for generating the auxiliary force, and
   a device for determining a brake pedal actuation force,
   wherein the device for determining the brake pedal actuation force includes an auxiliary force determining device and a pressure sensor which detects a pressure of the brake master cylinder,
   wherein a brake pedal actuation force signal ($F_{Bet,Ped}$) is determined by evaluation of output signals of the pressure sensor and of the auxiliary force determining device.

2. The brake actuating unit as claimed in claim 1, wherein an auxiliary force ($F_{Verst}$) generated by the electromechanical drive unit is transmitted by a hydraulic device to the booster stage, and the auxiliary force determining device includes a pressure sensor which detects a pressure of the hydraulic device.

3. The brake actuating unit as claimed in claim 1, wherein an auxiliary force ($F_{Verst}$) generated by the electromechanical drive unit is transmitted by a mechanical device to the booster stage, and the auxiliary force determining device includes a force sensor which detects a force ($F_{Abstütz}$) exerted by the mechanical device.

4. The brake actuating unit as claimed in claim 1, wherein an auxiliary force ($F_{Verst}$) generated by the electromechanical drive unit is transmitted by a mechanical device to the booster stage, and the auxiliary force determining device includes a device which estimates an auxiliary force from activation signals and state variables of the electromechanical drive unit.

5. The brake actuating unit as claimed in claim 1, wherein output signals of the pressure sensor and of the auxiliary force determining device are supplied to an electronic control unit which are used to activate a drive unit of the booster stage.

6. The brake actuating unit as claimed in claim 5, wherein an electrical energy accumulator is provided for supplying electrical energy to the electronic control unit and the drive unit.

7. The brake actuating unit as claimed in claim 2, wherein the booster stage has a booster piston which delimits in a booster housing a booster chamber which is connected by a blockable hydraulic connection to an unpressurized pressure medium reservoir.

8. The brake actuating unit as claimed in claim 7, wherein an electromagnetically activatable, currentlessly open (SO) 2/2-way valve is provided for blocking the blockable hydraulic connection.

9. The brake actuating unit as claimed in claim 7, further comprising a displacement sensor which detects a travel ($s_2$) of the booster piston, wherein an output signal of the displacement sensor is supplied to the electronic control unit.

10. The brake actuating unit as claimed in claim 7, further comprising a displacement sensor which detects an actuation travel of the hydraulic device and an output signal of which is supplied to the electronic control unit.

11. The brake actuating unit as claimed in claim 9, wherein displacement signals detected are used to infer impending force signal changes from displacement signal changes.

12. The brake actuating unit as claimed in claim 11, wherein the impending force signal changes are changes in the brake pedal actuation force signal.

13. The brake actuating unit as claimed in claim 9, wherein the displacement signals detected are used to check an integrity of the brake actuating unit from correlations between displacement and force signals and between displacement signals among themselves.

14. The brake actuating unit as claimed in claim 3, wherein the mechanical device is formed by a reduction gear, the force sensor detecting a force ($F_{Abstütz}$) with which a force-transmitting part of the reduction gear is supported against a booster housing.

15. The brake actuating unit as claimed in claim 14, wherein the reduction gear is in the form of a ball screw drive which is driven by an electric motor.

16. The brake actuating unit as claimed in claim 15, wherein the force transmitting part of the reduction gear is formed by a threaded nut of the ball screw drive.

17. The brake actuating unit as claimed in claim 16, wherein the auxiliary force determining device is configured as a device for estimating a force ($F_{Abstütz}$) with which the force-transmitting part of the reduction gear is supported against the booster housing from activation signals and state variables of the electromechanical drive unit.

18. The brake actuating unit as claimed in claim 1, wherein the electronic control unit includes means for calculating the master cylinder actuation force ($F_{Bet,Hz}$) acting on the master cylinder piston from a hydraulic pressure ($p_{Hz}$) induced in the brake master cylinder, and for calculating a brake pedal actuation force ($F_{Bet,Ped}$) by subtracting an auxiliary force ($F_{Verst}$) or a support force ($F_{Abstütz}$) from the master cylinder actuation force ($F_{Bet,Hz}$) acting on the master cylinder piston.

\* \* \* \* \*